Aug. 3, 1948.　　　E. R. TRAXLER　　　2,446,311
POWER TRANSMISSION BELT
Filed Aug. 1, 1945
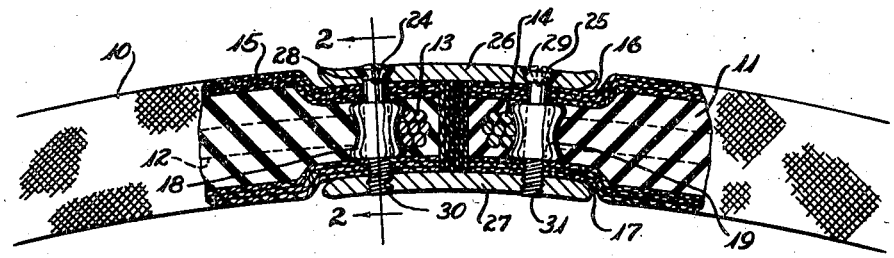
Fig-1
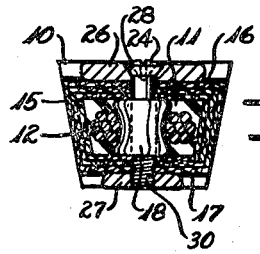
Fig-2
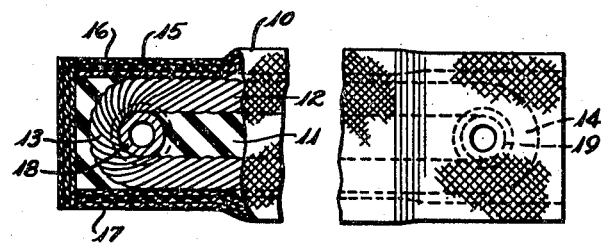
Fig-3
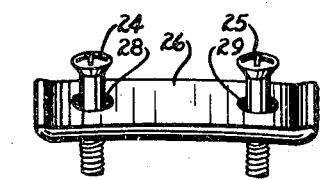
Fig-4
Inventor
Eugene R. Traxler
By
Atty Patented Aug. 3, 1948

2,446,311

UNITED STATES PATENT OFFICE 2,446,311

POWER-TRANSMISSION BELT

Eugene R. Traxler, Stow, Ohio, assignor to The B. F. Goodrich Company, New York, N. Y., a corporation of New York Application August 1, 1945, Serial No. 608,166

4 Claims. (Cl. 74—231)

This invention relates to power transmission belts and is especially useful in the manufacture of side-driving V-belts for use on grooved pulleys.

Power transmission belts of the side-driving or V-belt type for use on grooved pulleys are extensively used in the driving of light machinery and the belts are usually made in endless form. Many machines are so constructed as to make difficult the removal and replacement of endless V-belts and it is desirable to employ belts which are not endless and which have their ends connected together by fastener means so that the belt may be removed or replaced conveniently without taking down the machine.

The present invention is an improvement of the power transmission belt covered by Patent No. 2,295,029 of John M. Cooney and Wm. B. Collier.

The principal objects of the present invention are to provide a single grommet reinforced belt having grommet-engaging fastening means entirely embedded within the material of the belt; to provide a belt having ends of reduced thickness to permit coupling of the ends without increasing the total thickness of the belt; to provide a connected belt having connecting means arranged to the mean curvature of the belt in use and to provide for coupling of belts with the least amount of effort.

These and other objects will appear from the following description and the accompanying drawings:

Of the drawings:

Fig. 1 is a side elevation of a portion of a belt at the connected ends, parts being broken away and parts shown in section.

Fig. 2 is a cross sectional view taken on line 2—2 of Fig. 1.

Fig. 3 is a plan view of the two ends of the belt, one of the ends being partly broken away and shown in section.

Fig. 4 is a perspective view of the parts of the connectors.

Referring to the drawings, the numeral 10 designates a belt of trapezoidal cross-section formed of a body 11 of rubber or other material having the physical properties of vulcanized soft rubber, such as synthetic rubber, which materials, including vulcanized rubber compositions, will be herein designated as rubber-like materials. Embedded within the rubber-like material is an endless grommet 12 of reinforcing material such as cord or cable formed from cotton or other textile fibers or of metallic wires and having loops 13, 14 at the ends of the belt connected by parallel reaches of the grommet which extends throughout the length of the belt in substantially parallel relation along the neutral axis of the belt. The belt may also be provided with a cover 15 of wear-resisting textile material such as square woven fabric, preferably bias-laid to reduce the resistance to bending and to conform to the curvature of the pulleys in use.

For providing anchorage of the loops of the grommet to connector elements and to avoid abrasion of the loops while at the same time providing a belt free from objectionable projections on its surface, the ends of the belt are rebated at their upper and lower surfaces as at 16 and 17 so that the ends of the belt are materially reduced in thickness and spools 18, 19 of metal or other stiff material are entirely embedded within the body of the belt and within the loops 13 and 14 of the reinforcing grommet. Apertures are provided in the belt in alignment with the bores of the spools to receive screws 24, 25 for connecting the ends of the belts to each other. A pair of apertured connector plates 26, 27 span the reduced ends of the belts. The plate 26 has apertures 28, 29 for receiving the heads of the screws 24, 25, the apertures preferably being countersunk to avoid projection of the screws, and the plate 27 has threaded apertures 30, 31 for engaging the threaded ends of the screws. The plates 26, 27 are formed to the mean curvature of the pulleys over which the belt will be operated in use, so as to avoid any substantial change of curvature of the belt.

The apertures in the plates are so arranged that the screws 24, 25, will be non-parallel with respect to each other but will be arranged on radii of the arc of curvature of the plates thereby relieving the ends of the belts from excessive bending. The reduction of the thickness of the ends of the belts provides a clearance for the connecting plates 26, 27 so that the plates clear the surfaces of pulleys even where the lower surface of the belt actually contacts with the pulley as in cases where the belt is used to drive between a grooved pulley and a flat faced pulley. The ends of the connector plates are rounded to avoid cutting of the rubber and fabric material and are preferably turned outwardly as to the plate 26 and inwardly as to the plate 27 to provide clearance of the ends adjacent the rubberized fabric material.

In molding the belt the spools 18, 19 are placed over locating pins in a mold cavity and the grommet 12 is placed about the spools in the molding cavity and surrounded by the rubber and textile material for forming the body of the belt. The locating pins of the mold extend across the mold cavity and thereby form the screw holes in the ends of the belt during the molding process. After the spools with the grommet thereabout have been embedded in the rubber and fabric material, the molded belts may be trimmed and buffed if desired without contact of the trimming knives or buffing wheels with the material of the spools which are well embedded below the surface of the belt ends.

Variations may be made without departing from the scope of the invention as it is defined by the following claims.

I claim:

1. A side-driving belt comprising a flexible two-ended body including rubber-like material, a single flexible endless grommet of reinforcing material disposed in a single elongated loop with the two intermediate reaches of said loop disposed side by side between the side driving faces of said body and embedded therein and the two end portions of the loop disposed at the ends of said body, reinforcing spools of stiff material embedded entirely in the ends of said body within the loops of the grommet with the ends of said spools at the upper and lower faces of the rubber-like material, a covering overlying the ends of said spools and said body of rubber-like material, connector plates overlapping abutting ends of said body at the upper and lower faces of the belt, and clamping elements extending through the ends of the belt, said clamping elements extending through said spools and said covering and engaging said connector plates.

2. A side-driving belt comprising a flexible two-ended body of trapezoidal cross section including rubber-like material, said body having its ends rebated in thickness at its upper and lower faces, a single flexible endless grommet of reinforcing material disposed in a single elongated loop with the two intermediate reaches of said loop disposed side by side between the side driving faces of said body and embedded therein and with the two end portions of the loop disposed at the ends of said body, reinforcing spools of stiff material embedded entirely in the ends of said body within the loops of the grommet with the ends of said spools at the upper and lower faces of the rubber-like material, a covering of fabric overlying the ends of said spools and said body of rubber-like material, connector plates overlapping abutting ends of said body at the rebated portions thereof, and clamping elements extending through the ends of the belt, said clamping elements extending through said spools and said covering and engaging said connector plates.

3. A side-driving belt comprising a flexible two-ended body of trapezoidal cross-section including rubber-like material, said body having its ends rebated in thickness at its upper and lower faces, a single flexible endless grommet of reinforcing material disposed in a single elongated loop with the two intermediate reaches of said loop disposed side by side between the side driving faces of said body and embedded therein and the two end portions of the loop disposed at the ends of said body, reinforcing spools of stiff material embedded entirely in the ends of said body within the loops of the grommets with the ends of said spools at the upper and lower faces of the rubber-like material, a covering of fabric overlying the ends of said spools and said body of rubber-like material, connector plates overlapping abutting ends of said body at the rebated portions thereof, said plates being disposed entirely below the upper and lower surfaces of the body of the belt, and screws extending through the ends of the belt, said screws extending through said spools and said covering and engaging said connector plates.

4. A side-driving belt as defined by claim 3, in which said connector plates are curved to correspond with the mean curvature of the belt in use.

EUGENE R. TRAXLER.

REFERENCES CITED

The following references are of record in the file of this patent:

UNITED STATES PATENTS

| Number | Name | Date |
|---|---|---|
| 1,313,028 | Smith et al. | Aug. 12, 1919 |
| 1,968,893 | Koester | Aug. 7, 1934 |
| 2,295,029 | Cooney et al. | Sept. 8, 1942 |

FOREIGN PATENTS

| Number | Country | Date |
|---|---|---|
| 327,529 | Germany | Oct. 18, 1920 |
| 184,892 | Great Britain | Aug. 31, 1922 |